Feb. 4, 1969  E. J. ROBBINS  3,426,222
MAGNETO-HYDRO DYNAMIC GENERATORS
Filed April 22, 1964
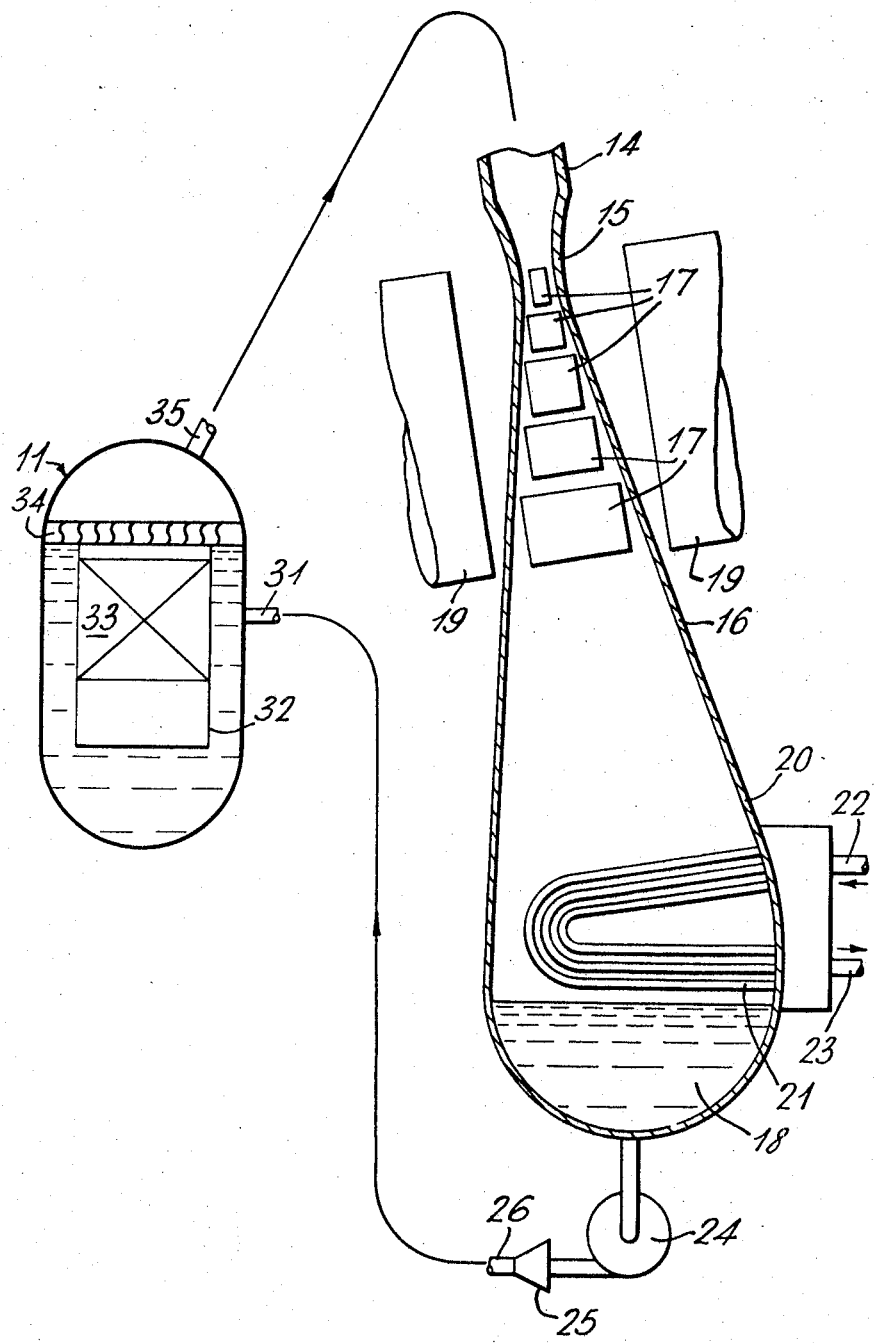

United States Patent Office 3,426,222
Patented Feb. 4, 1969

3,426,222
MAGNETO-HYDRO DYNAMIC GENERATORS
Eric John Robbins, Warrington, England, assignor to United Kingdom Atomic Energy Authority, London, England
Filed Apr. 22, 1964, Ser. No. 361,828
Claims priority, application Great Britain, May 1, 1963, 17,119/63
U.S. Cl. 310—11             11 Claims
Int. Cl. H02k 45/00; G21d 7/02

ABSTRACT OF THE DISCLOSURE

A magnetohydrodynamic generator wherein the working fluid is partially condensed just prior to passing through the magnetic field whereby the density of the fluid at a given temperature is changed and thus the energy required to produce electrons is reduced.

---

This invention relates to magnetohydrodynamic (hereinafter abbreviated M.H.D.) generators and is particularly concerned with the working fluid therefor.

The M.H.D. method of generating electrical energy requires that a fluid moving at high velocity through a magnetic field (hereinafter referred to as the "working fluid") is electrically conductive. This fluid, on being driven through the magnetic field, has an electromotive force generated in it which will cause a current to flow through electrodes situated on either side of the fluid, the electrodes being connected through some external electrical load. The power density generated is proportional to the expression $$\sigma \cdot B^2 \cdot v^2 \cdot f(\beta)$$

where $\sigma$ is the electrical conductivity of the working fluid,
B is the magnetic field strength,
$v$ is the velocity of the working fluid, and
$f(\beta)$ is a complex function of the electron mobility in the working fluid and the magnetic field strength. It is inevitably less than unity.

To attain the necessary conversion from heat energy to electrical energy at high efficiency the working fluid must be gaseous. A fundamental difficulty in developing M.H.D. generators lies in obtaining a high value of working fluid conductivity ($\sigma$) under prolonged operating conditions. To obtain sufficient conductivity in ordinary gases (a value greater than 0.1 mho/centimetre is desirable) it is necessary to heat them to temperatures of the order of 10,000° K. This temperature can be reduced to the region of 2500–3000° K. by seeding a "carrier" gas (for example helium or a mixture of hydrocarbon fuels and oxygen) with a readily ionisable material such as an alkali metal vapour. Even at these temperatures there is great difficulty in containing the resulting fluid.

It is an object of the present invention to enable an even greater reduction of the temperature of the working fluid whilst maintaining its conductivity at a value that can be of use in a practical device.

In attaining this object it is intended to reduce the energy required to produce electrons (that is, effectively to increase the value of $\sigma$ in the above-quoted expression) by increasing the charge density at a given temperature.

According to one aspect of the invention, in an M.H.D. generator a working fluid comprises a partially condensed metal vapour. Such a partially condensed vapour may be generated by expanding vaporised metal, substantially adiabatically, through a nozzle. Convenient metals for this purpose are the alkali metals, or calcium, or barium, or combinations of these.

According to another aspect of the invention, in an M.H.D. generator a working fluid consists of at least one selected from the group lithium, sodium, potassium, rubidium, caesium, calcium and barium and in the form of a partially condensed vapour carried in a gas.

According to yet another aspect of the invention, an M.H.D. generator comprises a working fluid flow path, a metal vaporising means and a nozzle for the supply of metal vapour from said vapourising means into said flow path, the nozzle being shaped to expand metal vapour in a substantially adiabatic manner giving a partially condensed metal vapour for passage along the flow path either alone or in a mixture with a carrier gas along the flow path.

By means of the invention the thermionic energy required for electron production is now reduced because the energy required to remove an electron from a condensed metallic droplet, that is, the "work function," is much less than that required to remove an electron from a metallic atom, that is, the "ionisation potential." As less energy is required for a given degree of ionisation in the working fluid the temperature of that fluid can be reduced. Thus the value of $\sigma$ in the above-quoted expression is improved.

The wetness which it is aimed to achieve by the expansion through the nozzle is such as to correspond to a high density of ultrafine droplets. It is estimated for the purpose of more definite illustration of this aim that the droplet size should be in the diameter range $5\times 10^{-7}$ to $10^{-6}$ cm., or alternatively expressed, equivalent to an aggregation of atoms in the order of hundreds, and that the density should be of the order of $10^{13}$ per cu. cm.

An embodiment of the invention will not be described with reference to the accompanying diagrammatic drawing which for the most part is in section.

In the drawing a boiling metal cooled nuclear reactor 11 utilises lithium metal coolant. Coolant enters the reactor at inlet 31 passes downwardly outside the baffle 32 and then upwardly within the baffle 32 through the nuclear fuel core 33 to boil and give off vapour which passes through the liquid/vapour separator 34 and so out of the reactor through outlet 35. The outlet 35 is connected by a pipe 14 to a nozzle 15. The nozzle 15 diverges into a flow tube 16 which contains along its length a series of pairs of electrodes 17 (only one of each pair being shown) which are externally coupled, in parallel across an electrical load (not shown). Poles 19 of an electromagnet are mounted, external to the flow tube, at right angles to the pairs of the electrodes. The flow tube 16 feeds into a metal vapour condenser section 20 which has within it heat exchanger pipes 21. Coolant, such as water, is circulated through pipes 21 by way of coolant inlet pipe 22 and outlet pipe 23. A sump 18 in which condensed liquid metal collects is connected to a pump 24 for returning liquid metal in a closed cycle to the reactor 11 via a non-return valve 25 and a pipeline 26. All the surfaces of the generator likely to be contacted by liquid or vapourised lithium are coated with tantalum, the nozzle 15 being machined from solid tantalum. All components of the generator are lagged to reduce heat loss.

To operate the generator lithium metal is vaporised within the reactor 11, by means of the nuclear fuel core 33, to produce lithium vapour at 1 atmospheric pressure and 1650° K. on the upstream side of the nozzle 15. Adiabatic expansion of the vapour through the nozzle 15 follows so as to produce a partially condensed vapour at 540 mms. mercury pressure and 1400° K. moving at high velocity. The fast moving vapour passes through the magnetic field produced between the pole pieces 19 of the electromagnet and so generates a current, at right angles to the magnetic field, between the electrode pairs 17 and so through the electrical load. A braking effect is experienced by the vapour particles in passing through the magnetic field due to electromagnetic interaction. The slowed stream of vapour now passes into the condenser section 20 where the vapour is condensed by coolant passing through the inside of the heat exchanger pipes 21. The heat exchange results in the generation of steam which can be used to drive a steam turbine. The condensed metal vapour can subsequently be pumped back from the condenser section 20 into the reactor 11 by way of the pump 24, the valve 25 and the pipeline 26 and the coolant inlet 31.

In another embodiment of the invention a gas such as helium is used which is seeded with the vaporised metal. Such an arrangement could be utilised where the gas is used to cool a nuclear reactor and is subsequently combined with the vaporised metal. The vapour may, after use, be condensed out of the gas so that the gas can be reused in the reactor. In other embodiments any of the other rare gases besides helium may be used, e.g. neon, argon, krypton or xenon.

In another embodiment—suitable for space applications the condenser 20 can be replaced by a heat radiator, the metal vapour to be condensed being led through a nest of tubes so that a considerable surface area is exposed.

I claim:

1. In a magnetohydrodynamic generator comprising a duct and a nozzle in said duct, a working fluid in the duct comprising a metal vapor carried in a gas, the metal vapor being in a partially condensed condition as the result of the passage of said working fluid through the nozzle in said duct.

2. A working fluid according to claim 1 wherein the gas is selected from the group comprising helium, neon, argon, krypton and xenon.

3. In a magnetohydrodynamic generator comprising a duct, a nozzle in said duct, and means for generating a magnetic field transverse the duct adjacent said nozzle, a working fluid in the duct comprising a metal vapor which is in a partially condensed condition as the result of the passage of said working fluid through the nozzle in said duct, the nozzle being shaped to condense the working fluid from a fully vaporized to a partially condensed vapor solely by the expansion of the fluid.

4. A working fluid according to claim 3 wherein the metal vapor comprises at least one element selected from the group consisting of lithium sodium, potassium, rubidium, cesium, calcium, and barium.

5. A working fluid according to claim 3 wherein the metal vapor comprises lithium.

6. A working fluid according to claim 3 wherein the metal vapor is carried in a gas.

7. A working fluid according to claim 6 wherein the gas is selected from the group comprising helium, neon, argon, krypton and xenon.

8. A magnetohydrodynamic generator comprising in combination a duct for working fluid, a nozzle in the duct, metal vaporizing means, inlet means to supply metal vapor from said vaporizing means into said duct upstream of said nozzle, means to set up a magnetic field across the duct downstream of, and adjacent to, said nozzle, said nozzle being shaped to condense the working fluid passing therethrough from a fully vaporized to a partially condensed vapor solely by the expansion of the fluid.

9. A magnetohydrodynamic generator according to claim 8 having a metal vapor condenser located downstream of said electrodes for completely condensing said partially condensed metal vapor, and means for returning the resulting condensed liquid metal in a closed cycle to said vaporizing means.

10. A method of generating electrical power in a magnetohydrodynamic generator having a duct, a nozzle in the duct and means to set up a magnetic field across the duct downstream from, and adjacent, said nozzle, said method comprising passing into the duct upstream of said nozzle a vaporized liquid metal, forcing said vaporized liquid metal through said nozzle such that the vaporized metal is expanded thereby from a fully vaporized vapor to a partially condensed vapor, drawing said partially condensed vapor through said magnetic field, and recovering from the duct electrical energy generated by the interaction of said partially condensed vapor with said magnetic field.

11. A magnetohydrodynamic generator according to claim 8 wherein said metal vaporizing means is a cooled nuclear reactor.

References Cited

UNITED STATES PATENTS

| 3,320,444 | 5/1967 | Prem | 310—11 |
| 1,509,103 | 9/1924 | Elliot | 310—11 |
| 3,102,224 | 8/1963 | Maeder | 310—11 X |
| 3,247,405 | 4/1966 | Rosner | 310—11 |

FOREIGN PATENTS 23,981  10/1962  Germany.

Direct Generation of Electric Power by Harris, D. J.; Electrical Engineering, December 1961; page 974.

J D MILLER, *Primary Examiner.*

DAVID X. SLINEY, *Assistant Examiner.*